United States Patent

[11] 3,581,211

[72] Inventors Peter Maitland;
Richard W. Ehrhorn, both of Electronic Communications, Inc. P.O. Box 12248, St. Petersburg, Fla. 33733

[21] Appl. No. 786,675
[22] Filed Dec. 24, 1968
[45] Patented May 25, 1971

[54] SYSTEM FOR SIMULTANEOUS RECEPTION OF MULTIPLE SIGNALS
9 Claims, 3 Drawing Figs.

[52] U.S. Cl. 325/451, 325/47, 325/305, 325/439, 343/206
[51] Int. Cl. H04b 1/26
[50] Field of Search 325/59, 60, 47, 339, 302, 305, 307, 3, 451, 430, 435, 439, 345, 44; 307/304; 343/205, 206

[56] References Cited

UNITED STATES PATENTS

| | | | |
|---|---|---|---|
| 1,882,772 | 10/1932 | Callahan | 325/339 |
| 2,302,951 | 11/1942 | Peterson | 325/345X |
| 2,669,712 | 2/1954 | Rial | 325/307X |
| 3,302,118 | 1/1967 | Schoen | 325/451 |

*Primary Examiner*—Robert L. Griffin
*Assistant Examiner*—R. S. Bell
*Attorney*—Hopgood & Calimafde

ABSTRACT: In this invention, two RF signals of different carrier frequencies and having different amplitude characteristics are received and the information content of each is used simultaneously. For example, when the RF signals carry different audio signals, this invention allows simultaneous listening by developing output signals of substantially equal magnitude.

PATENTED MAY 25 1971 3,581,211

INVENTORS
PETER MAITLAND
RICHARD W. EHRHORN
BY
Hopgood & Calimafde
ATTORNEYS

SYSTEM FOR SIMULTANEOUS RECEPTION OF MULTIPLE SIGNALS

This invention relates to a system for the simultaneous reception of multiple signals, and more particularly, relates to a receiver for receiving a plurality of radio signals which can be listened to simultaneously.

It is sometimes desirable to use a single receiver for receiving two different signals simultaneously, e.g., when monitoring or communicating with one transmission and searching for another. In conventional practice, this is performed in a superheterodyne receiver by using two local oscillators and mixing one oscillator output and one signal and the other oscillator output with the second signal all in a single mixer. Unfortunately, if the received signals differ considerably in strength, this method does not work well.

More specifically, when two signals are present in the first I.F. (39—40 mHz.) band, it is desirable to receive them simultaneously in the "dual-receive" mode. If the signals $V_{f1}$ and $V_{f2}$ are at $f_1$ and $f_2$ frequencies, then by tuning the VFO$_s$ to $f_{IF}\pm f_1$ and $f_{IF}\pm f_2$ this can be achieved. However, if the amplitudes of the two signals differ, the amplitudes of the IF output signals will similarly differ. Moreover, intermodulation below the two VFO signal inputs may cause unwanted spurious signals to be present in the I.F.

One of the objects of this invention is to provide RF signals of different magnitudes which can be tuned to give comparable signal levels at the I.F. to provide an additional control to allow the signals to be selectively faded in and out.

A further object is to provide control over the amplitude of the resulting output of a plurality of received radio signals.

A further object of this invention is to provide simple, less expensive means for simultaneously receiving and utilizing the information on two different radio signals.

A further object of this invention is to provide dual oscillators to simultaneously receive two signals of different frequencies.

Another object of this invention is to provide a multiplicative mixer in conjunction with oscillators fed through a differential attenuator to receive two signals of different amplitudes at the same apparent strength, and to provide for selectively fading the two signals.

Yet another object of this invention is to provide a novel means for frequency diversity reception.

The above-mentioned and other features and objects of this invention and the manner of attaining them will become more apparent and the invention itself will be best understood by reference to the following description of embodiments of the invention taken in conjunction with the accompanying drawings, wherein.

Figure 1:
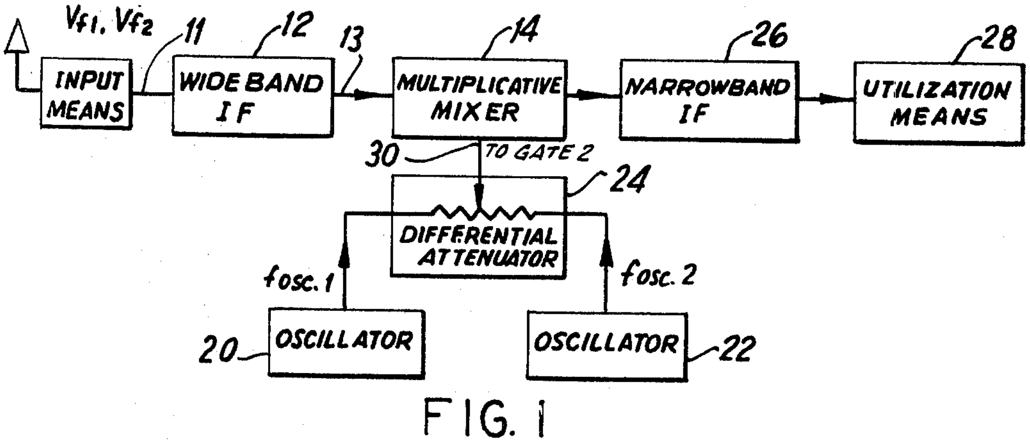
FIG. 1 is a block diagram of my invention.

Referring now to FIG. 1, there is shown a block diagram of the invention. An antenna 10 is coupled to the remainder of the receiver which comprises suitable input means to receive multiple RF signals and to develop specifically the two signals represented by $V_{f1}$ and $V_{f2}$. These signals are applied to a wideband I.F. stage 12 over lead 11 which is coupled over lead 13 to multiplicative mixer 14. Also applied to mixer 14 are the outputs from local oscillators 20, 22 producing $V_{osc1}$ and $V_{osc2}$, respectively. The frequencies $V_{osc1}$ and $V_{osc2}$ are applied to a differential attenuator 24, such as a potentiometer, and the output, such as from the center tap of the potentiometer, is applied to the mixer 14 over conductor 30. The signal at conductor 30 has two components, $K\ V_{osc1}$ and $V_{osc2}$, the ratio between the two components $K$ being dependent upon the setting of the differential attenuator. The output from the mixer 14 is applied to a narrow band I.F. stage 26 to obtain a limited frequency band and then to utilization means 28, such as a speaker.

Figure 2:
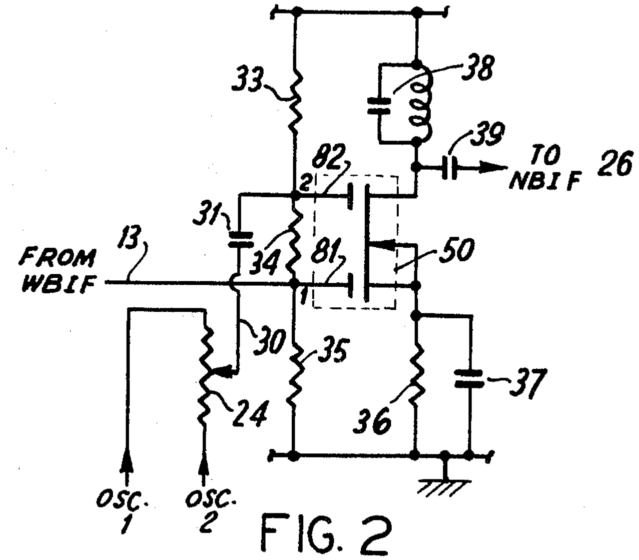
FIG. 2 is a circuit diagram illustrating the novel mixer arrangement.

As illustrated in FIG. 2, a dual-gate insulated gate field effect transistor 50 is used for the mixer, as it exhibits a true multiplicative action between its two gates. When two signals are present in the wideband I.F. they are converted by the appropriate local oscillators applied to the mixer to the frequency of the narrow band I.F. If $V_{g1}$ and $V_{g2}$ are the voltages at gates 1 and 2, then the output $V_o=C\ V_{g1}V_{g2}$, where $C$ is a constant. The two oscillator signals are applied to gate 2 of the mixer over lead 30 and through coupling capacitor 31. The two signal voltages $V_{f1}$ and $V_{f2}$ are applied to gate 1 terminal over lead 13. The $V_{f1}$ and $V_{f2}$ signals are multiplied by oscillator signals of different strengths as developed by the differential attenuator and represented by $K\ V_{osc1}+V$, and which is used to selectively fade in or out the two signals. Then, $V_{g1}=V_{f1}+V_{f2}$ and $V_{g2}=K\ V_{osc1}+V_{osc2}$. Therefore, $V_0=C(V_{f1}+V_{f2})(KV_{osc1}+V_{osc2})$. If, by using appropriate filtering, such as developed in the narrow IF stage 26, the only frequencies considered are those resulting in an I.F. output, i.e. falling with the I.F. passband, then $V_o=C(V_{f1}\cdot_{osc1}+V_{f2}\cdot V_{osc2})$.

If $V_{f1}$ is greater than $V_{f2}$ by a factor $N$, where $N$ is greater than 1, the expression becomes:

$$V_o=(N\ V_{f1}\cdot K\ V_{osc1}+V_{f2}\cdot V_{osc2})$$

By adjusting the ratio of the amplitudes of $K\ V_{osc1}$ and $V_{osc2}$ so that $K=1/N$, equal amplitude I.F. output voltages are produced. This variation and control over $K$ is obtained by varying the differential attenuator. Use of a dual insulated gate field effect transistor, such as the MOSFET 3N141 and a differential attenuator to vary the proportions of the two VFOs injected into the mixer produces this result. This MOSFET exhibits a true multiplicative action between the signal on its two gate electrodes $g_1$ and $g_2$, and therefore, the differential attenuator acts as a fader for fading in one signal. This equality occurs due to the true multiplicative action of the dual insulated gate mixer transistor, and would not take place with most other types of mixers.

Dual-gate field effect transistors are, of course, conventional, for example, field effect transistors 3N140, 3N141 are known to have good characteristics for RF amplification and mixer applications at frequencies up to 300 MHz. These transistors feature a series arrangement of two separate channels, each channel having an independent control gate, and a single channel output.

Referring to the circuit illustrated in FIG. 2, resistors 33, 34, 35, 36, capacitor 37, and tuned circuit 38 perform biasing and other conventional functions and need not be discussed further.

It will be apparent that the invention disclosed herein, may employ other utilization means than the speaker previously suggested.

In conventional frequency diversity systems, information is transmitted over two frequencies. These frequencies are received and combined using predetection or post detection combining means. In this invention, if the same information appeared in $V_{f1}$ and $V_{f2}$, then the output at 26 would necessarily be the combined output of the information on the two frequencies. Thus, the invention acts as an integral frequency diversity detector and combiner.

If electronic attenuators are used, then they may be automatically controlled by feedback loops to obtain a simple frequency diversity system, with minimum duplication of receiver circuitry.

Figure 3:
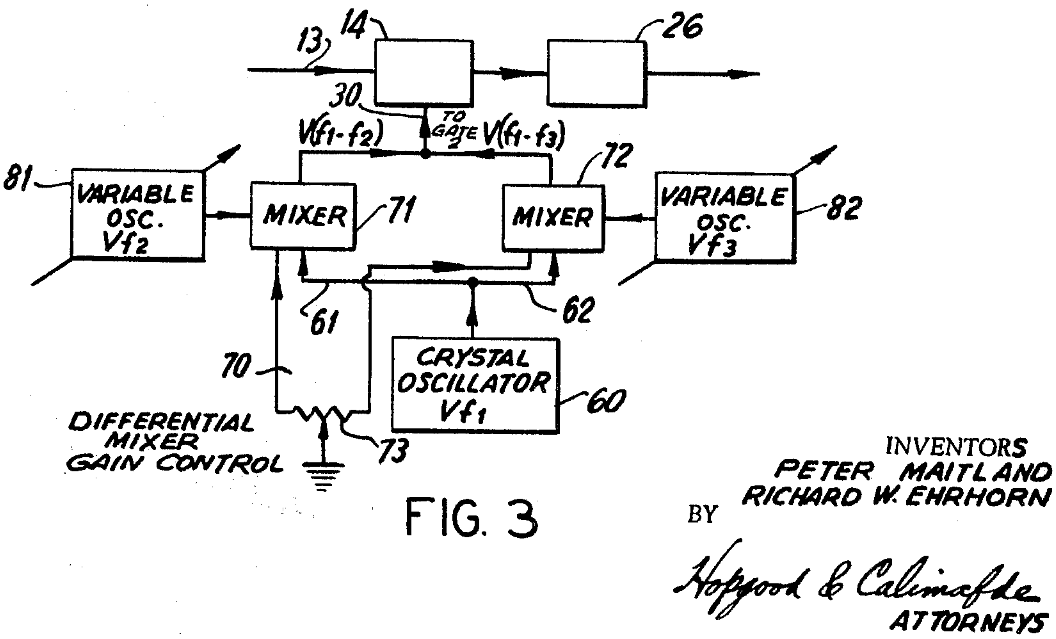
FIG. 3 is a diagram of an embodiment related to that of FIG. 2 using an electronic fading means.

In the embodiment of FIG. 3, I.F. stage 12, mixer 14, narrow band I.F. stage means 26, and utilization means 28 function in the same manner as previously described. Mixer 14 utilizes the same exemplary embodiment as illustrated in FIG. 2, and the signals applied from the wideband I.F. over lead 13 to gate 1 are the same. Two frequencies are applied over lead 30 to gate 2 as in the previous embodiments, and the amplitude of these frequency signals are differentially controlled and the principle therefore of FIG. 3 is the same as in the foregoing embodiments.

There is shown mixers 71 and 72 and a crystal oscillator 60 producing a signal $V_{f1}$ at a frequency $f_1$. $V_{f1}$ is applied over conductors 61 and 62, respectively, to mixers 71 and 72. Mixers 71 and 72 have an associated differential gain control 70 including a variable potentiometer 73. Gain control 70 is intended to suggest that the respective gains of mixers 71 and 72 may be controlled and in the embodiment illustrated when the setting of the potentiometer 73 changes the gains of mixers 71 and 72 are differentially varied. Those skilled in the art will recognize that the means by which the amplitude outputs of mixers 71 and 72 may be varied are well known and may include variable gain amplifiers in output stages of the mixers if so desired. Associated with mixer 71 is a variable oscillator 81 producing a voltage $V_{f2}$ at a frequency $f_2$ and associated with mixer 72 is a variable oscillator 82 producing a signal $V_{f3}$ at frequency $f_3$. Mixers 71 and 72 perform their respective frequency conversion processes so that the output from mixer 71 is a signal $V$ at a frequency $f_1 - f_2$ and the output from mixer 72 is a second frequency at a frequency $V$ $f_1 - f_3$. Respective oscillators 81 and 82 may be varied to provide tuning control depending upon the frequencies of the incoming signals.

While the foregoing description sets forth the principles of the invention in connection with specific apparatus, it is to be understood that this description is made only by way of example and not as a limitation of the scope of the invention as set forth in the objects thereof and in the accompanying claims.

What we claim is:

1. A receiver for simultaneously receiving two RF signals each at a different carrier frequency, and each having different amplitude varying voltage levels comprising:
   - a mixer,
   - said mixer comprising a dual insulated gate transistor means, in which signals applied to the gate are linearly multiplied;
   - first and second oscillators;
   - means to serially apply the two RF signals to said mixer at one gate of said transistor means,
   - means for applying the output voltages from said first and second oscillators to said mixer at the other gate of said dual insulated gate transistor means, including means to control the amplitude proportion of respective voltages from each of said first and second oscillators to said gate of said mixer,
   - and means to derive multiple information signals over a single frequency at the output of said mixer.

2. The receiver of claim 1 in which the applying means to control the proportion of respective voltages includes differential attenuator means, said attenuator means receiving the outputs from each of said oscillators.

3. The receiver of claim 1 in which said applying means includes an electronic attenuator.

4. The receiver of claim 3 in which the electronic attenuator includes a pair of dual insulated gate transistors exhibiting multiplicative action between the signals applied to each gate.

5. A receiver for simultaneously receiving two RF signals each at a different carrier frequency and having different voltage levels comprising:
   - a first linear mixer having dual insulated gates and providing linear multiplication action between the signals on its gates,
   - first frequency signal producing means,
   - second frequency signal producing means,
   - means to additively combine the outputs from said first and second frequency producing means and to couple said combined output to one gate of said mixer, the two RF signals being applied to the other gate of said mixer,
   - means to control the proportion of the respective signals from said first and second frequency producing means as they are additively combined,
   - and means to derive multiple information signals over a single channel at the output of said mixer, and utilization means to utilize said derived signals.

6. The receiver of claim 5 is which the utilization means includes speaker means.

7. The receiver of claim 5 in which the two RF signals are signals at different frequencies having the same information components, whereby said receiver operates as a component in the frequency diversity system.

8. The receiver of claim 5 in which said first producing means is a first oscillator, said second producing means is a second oscillator, and said control means includes a coupling differential attenuator for said oscillators.

9. The receiver of claim 5 in which said first producing means comprises a mixer and an associated variable frequency oscillator, said second frequency producing means includes a mixer and a second variable frequency oscillator, a reference oscillator coupled to each of said mixers, and means coupled to said mixers to differentially control the respective amplitude outputs therefrom.